United States Patent
Nakamichi

(10) Patent No.: US 10,178,297 B2
(45) Date of Patent: Jan. 8, 2019

(54) ACCESSORY APPARATUS, IMAGE-CAPTURING APPARATUS, CONTROL METHOD AND STORAGE MEDIUM STORING CONTROL PROGRAM

(71) Applicant: CANON KABUSHIKI KAISHA, Tokyo (JP)

(72) Inventor: Takahito Nakamichi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 15/472,338

(22) Filed: Mar. 29, 2017

(65) Prior Publication Data

US 2017/0289432 A1 Oct. 5, 2017

(30) Foreign Application Priority Data

Mar. 31, 2016 (JP) .................................. 2016-069852

(51) Int. Cl.
| | | |
|---|---|---|
| *G02B 13/16* | (2006.01) | |
| *H04N 5/225* | (2006.01) | |
| *H04N 5/232* | (2006.01) | |
| *G03B 17/56* | (2006.01) | |

(52) U.S. Cl.
CPC ......... *H04N 5/23209* (2013.01); *G03B 17/56* (2013.01); *H04N 5/2251* (2013.01)

(58) Field of Classification Search
CPC .................................................. H04N 5/23209
USPC .......................................................... 348/335
See application file for complete search history.

(56) References Cited

U.S. PATENT DOCUMENTS

| | | |
|---|---|---|
| 9,426,368 B2 | 8/2016 | Tamura |
| 2011/0157341 A1* | 6/2011 | Fukumoto .......... H04N 5/23209 348/61 |
| 2013/0308042 A1 | 11/2013 | Kawada |

(Continued)

FOREIGN PATENT DOCUMENTS

| | | |
|---|---|---|
| JP | 2012058524 A | 3/2012 |
| JP | 2015121638 A | 7/2015 |

OTHER PUBLICATIONS

European Search Report issued in European Patent Application No. 17163760.6 dated Sep. 5, 2017.

*Primary Examiner* — Anthony J Daniels
(74) *Attorney, Agent, or Firm* — Rossi, Kimms & McDowell LLP

(57) ABSTRACT

The accessory apparatus includes an accessory communicator providing, with an image-capturing apparatus, three channels that are a notification channel, a first data communication channel and a second data communication channel. The image-capturing apparatus and the accessory apparatus are each configured to have a function of switching the second data communication channel between a first setting in which the data transmission from the image-capturing apparatus to the accessory apparatus is allowed and a second setting in which data transmission from the accessory apparatus to the image-capturing apparatus is allowed, The accessory controller is configured to, in response to receiving from the image-capturing apparatus through the notification channel a first notice indicating completion of switching from the first setting to the second setting in the image-capturing apparatus, switch from the first setting to the second setting in the accessory apparatus.

19 Claims, 7 Drawing Sheets

(56) References Cited

U.S. PATENT DOCUMENTS

| | | | |
|---|---|---|---|
| 2015/0181092 A1* | 6/2015 | Tamura | H04N 5/23209 348/360 |
| 2015/0301430 A1* | 10/2015 | Irie | H04N 5/23209 396/135 |
| 2018/0027174 A1* | 1/2018 | Sengoku | H04N 5/23209 348/207.11 |
| 2018/0224721 A1* | 8/2018 | Pan | G03B 17/565 |

* cited by examiner

ACCESSORY APPARATUS, IMAGE-CAPTURING APPARATUS, CONTROL METHOD AND STORAGE MEDIUM STORING CONTROL PROGRAM

BACKGROUND OF THE INVENTION

Field of the Invention

The present invention relates to an image-capturing apparatus (hereinafter referred to as "a camera body") and an accessory apparatus such as an interchangeable lens, which are communicable with each other.

Description of the Related Art

In an accessory-interchangeable camera system including a camera body to which an accessory apparatus is detachably attachable, the camera body and the accessory apparatus communicate with each other for controlling the accessory apparatus from the camera body and for providing, from the accessory apparatus to the camera body, data required for controlling the accessory apparatus. In particular, when an interchangeable lens is used for capturing a moving image to be recorded or a live-view moving image to be displayed, smooth lens control in synchronization with image-capturing periods is required, so that it is necessary to synchronize image-capturing times in the camera body with control times in the interchangeable lens. Thus, the camera body is required to complete receipt of the data from the interchangeable lens and transmission of various commands and requests to the interchangeable lens in one image-capturing period.

However, an increase of an amount of the data to be received by the camera body from the interchangeable lens and a reduction of the image-capturing period (that is, an increase of a frame rate) require large volume data communication in a shorter time.

Japanese Patent Laid-Open No. 2015-121638 discloses a camera system that uses, when transmitting a large amount of data from an interchangeable lens to a camera body, a communication channel used normally for data transmission from the camera body to the interchangeable lens as one for data transmission from the interchangeable lens to the camera body. This camera system originally provides another communication channel for the data transmission from the interchangeable lens to the camera body, and thus the large amount of data is transmitted from the interchangeable lens to the camera body through the two communication channels.

However, the camera system disclosed in Japanese Patent Laid-Open No. 2015-121638 uses five communication channels. The five communication channels include one channel for transmitting and receiving synchronization clock signals based on which the camera body and the interchangeable lens transmit and receive data in synchronization with each other, two channels for mutually notifying the camera body and the interchangeable lens of data communication start and end times and directions, and two channels for transmitting and receiving data. Use of such a lot of communication channels causes various problems such as an increase in electric power consumption and a difficulty in miniaturization of the camera body and the interchangeable lens. Furthermore, for the above-mentioned channel whose communication direction is allowed to be changed, it is necessary at the time of switching the communication direction to avoid a collision between data transmitted from the interchangeable lens to the camera body and data transmitted from the camera body to the interchangeable lens.

SUMMARY OF THE INVENTION

The present invention provides an accessory apparatus and an image-capturing apparatus each capable of transmitting and receiving a large amount of data between these apparatuses with channels whose number is as small as possible.

The present invention provides an aspect thereof an accessory apparatus detachably attachable to an image-capturing apparatus. The accessory apparatus includes an accessory communicator configured to provide, with the image-capturing apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus, and an accessory controller configured to control data communication with the image-capturing apparatus through the accessory communicator. The image-capturing apparatus and the accessory apparatus are each configured to have a function of switching the second data communication channel between a first setting in which the data transmission from the image-capturing apparatus to the accessory apparatus is allowed and a second setting in which data transmission from the accessory apparatus to the image-capturing apparatus is allowed. The accessory controller is configured to, in response to receiving from the image-capturing apparatus through the notification channel a first notice indicating completion of switching from the first setting to the second setting in the image-capturing apparatus, switch from the first setting to the second setting in the accessory apparatus.

The present invention provides another aspect thereof an image-capturing apparatus to which an accessory apparatus is detachably attachable. The image-capturing apparatus includes a camera communicator configured to provide, with the accessory apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus, and a camera controller configured to control data communication with the accessory apparatus through the camera communicator. The image-capturing apparatus and the accessory apparatus are each configured to have a function of switching the second data communication channel between a first setting in which the data transmission from the image-capturing apparatus to the accessory apparatus is allowed and a second setting in which data transmission from the accessory apparatus to the image-capturing apparatus is allowed. The camera controller is configured to switch from the first setting to the second setting before the accessory apparatus does, and provide, in response to completion of switching from the first setting to the second setting in the image-capturing apparatus, a first notice indicating the completion of switching from the first setting to the second setting in the image-capturing apparatus to the accessory apparatus through the notification channel.

The present invention provides yet another aspect thereof a control method for an accessory apparatus detachably attachable to an image-capturing apparatus. The method includes the step of causing the accessory apparatus to provide, with the image-capturing apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus, the step of providing to each of the image-capturing apparatus and the accessory apparatus a function of switching the second data communication channel between a first setting in which the data transmission from the image-capturing apparatus to the accessory apparatus is allowed and a second setting in which data transmission from the accessory apparatus to the image-capturing apparatus is allowed, and the step of causing the accessory apparatus to, in response to receiving from the image-capturing apparatus through the notification channel a first notice indicating completion of switching from the first setting to the second setting in the image-capturing apparatus, switch from the first setting to the second setting in the accessory apparatus.

The present invention provides still another aspect thereof a control method for an image-capturing apparatus to which an accessory apparatus is detachably attachable. The method includes the step of causing the image-capturing apparatus to provide, with the accessory apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus, the step of providing to each of the image-capturing apparatus and the accessory apparatus a function of switching the second data communication channel between a first setting in which the data transmission from the image-capturing apparatus to the accessory apparatus is allowed and a second setting in which data transmission from the accessory apparatus to the image-capturing apparatus is allowed, and the step of causing the image-capturing apparatus to switch from the first setting to the second setting before the accessory apparatus does, and to provide, in response to completion of switching from the first setting to the second setting in the image-capturing apparatus, a first notice indicating the completion of switching from the first setting to the second setting in the image-capturing apparatus to the accessory apparatus through the notification channel.

The present invention provides as further another aspect thereof a non-transitory storage medium storing a computer program for causing a computer to execute any one of the above control methods.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
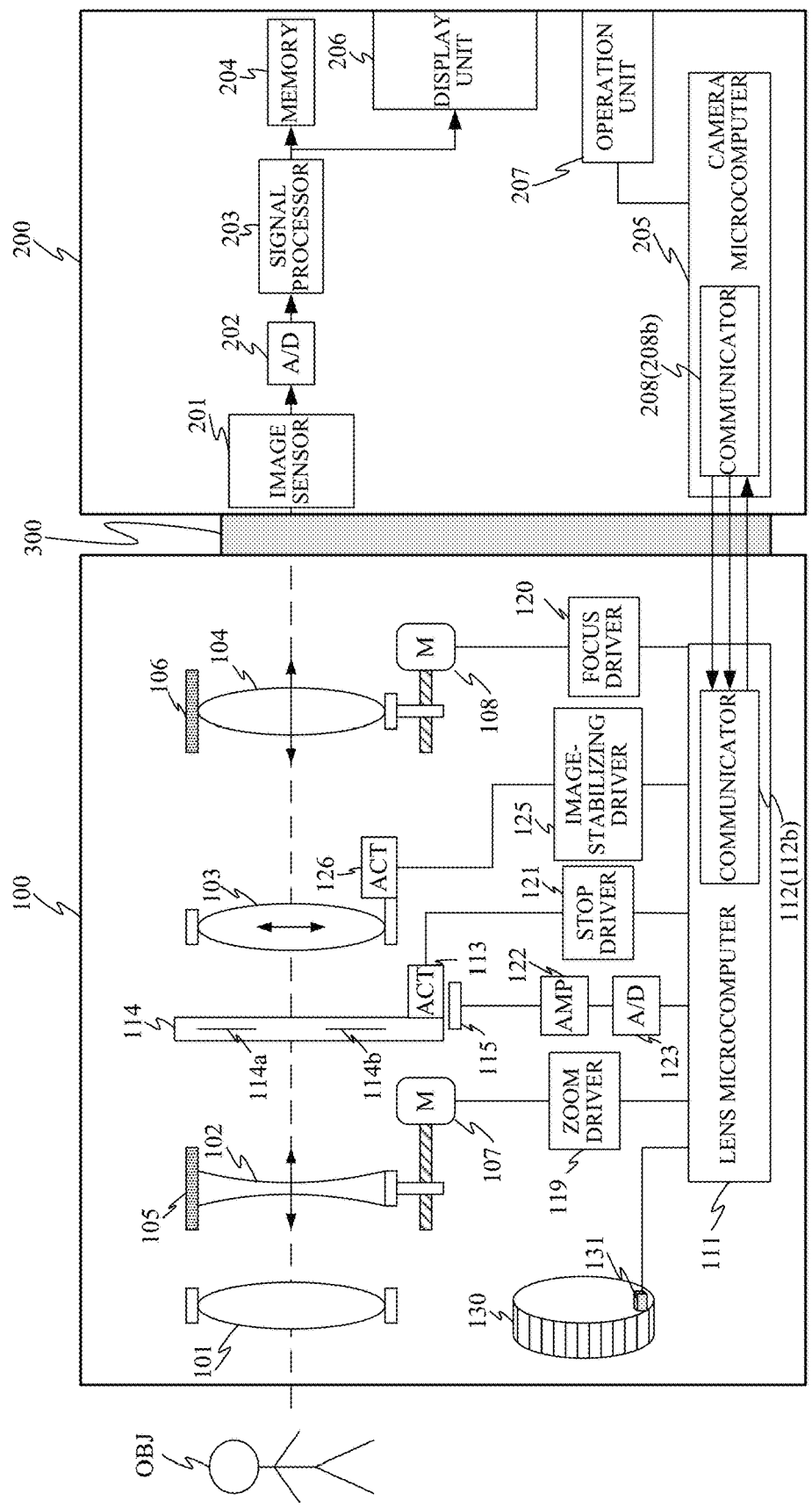
FIG. 1 is a block diagram illustrating a lens-interchangeable camera system that is Embodiment 1 of the present invention.

FIG. 1 illustrates a configuration of an image-capturing system (hereinafter referred to as "a camera system") including a camera body 200 as an image-capturing apparatus and an interchangeable lens 100 as an accessory apparatus that are a first embodiment (Embodiment 1) of the present invention.

The camera body 200 and the interchangeable lens 100 transmit control commands and internal information to each other via their communicators described later.

The communicators are compatible with various communication methods and switch their communication formats to the same one in synchronization with each other depending on types of data to be communicated and purposes of their communication, which enables selecting an optimum communication format for each of various situations.

First, description will be made of specific configurations of the interchangeable lens 100 and the camera body 200. The interchangeable lens 100 and the camera body 200 are mechanically and electrically connected with each other via a mount 300 including a coupling mechanism. The interchangeable lens 100 receives power supply from the camera body 200 via a power source terminal (not illustrated) provided in the mount 300 and supplies, to various actuators and a lens microcomputer 111 described later, power sources necessary for their operations. The interchangeable lens 100 and the camera body 200 communicate with each other via communication terminals (illustrated in FIG. 2) provided in the mount 300.

The interchangeable lens 100 includes an image-capturing optical system. The image-capturing optical system includes, from an object (OBJ) side, a field lens 101, a magnification-varying lens 102 for variation of magnification, a stop unit 114 for light amount control, an image-stabilizing lens 103 for image blur correction and a focus lens 104 for focusing.

The magnification-varying lens 102 and the focus lens 104 are respectively held by lens holders 105 and 106. The lens holders 105 and 106 are guided by guide bars (not illustrated) movably in an optical axis direction in which an optical axis (illustrated by a broken line) of the image-capturing optical system extends and are driven in the optical axis direction respectively by stepping motors 107 and 108. The stepping motors 107 and 108 rotate in synchronization with drive pulses and respectively move the magnification-varying lens 102 and the focus lens 104.

The image-stabilizing lens 103 is moved in a direction orthogonal to the optical axis of the image-capturing optical system to reduce image blur caused by user's hand jiggling or the like.

The lens microcomputer 111 as an accessory controller controls various operations in the interchangeable lens 100.

The lens microcomputer 111 receives, via a lens communicator 112 as an accessory communicator, control commands transmitted from the camera body 200 and transmission requests output therefrom. The lens microcomputer 111 performs various lens controls corresponding to the control commands and transmits lens data (accessory data) corresponding to the transmission requests to the camera body 200 via the lens communicator 112.

In addition, the lens microcomputer 111 outputs, in response to a zoom command and a focus drive command among the control commands, a zoom drive signal and a focus drive signal to a zoom driver 119 and a focus driver 120 to cause them to drive the stepping motors 107 and 108, thereby performing a zoom process to control a magnification variation operation by the magnification-varying lens 102 and an AF (autofocus) process to control a focus operation by the focus lens 104.

The interchangeable lens 100 is provided with a manual focus ring 130 that is rotationally operable by a user and a focus encoder 131 for detecting a rotational operation amount of the manual focus ring 130. The lens microcomputer 111 causes the focus driver 120 to drive the stepping motor 108 by a drive amount corresponding to the rotational operation amount of the manual focus ring 130 detected by the focus encoder 131 to drive the focus lens 104, thereby performing MF (manual focus).

The stop unit 114 includes stop blades 114a and 114b. An open-and-close state of the stop blades 114a and 114b is detected by a hall element 115, and a detection result thereof is input to the lens microcomputer 111 through an amplifier 122 and an A/D converter 123. The lens microcomputer 111 outputs, depending on the input signal from the A/D converter 123, a stop drive signal to a stop driver 121 so as to cause the stop driver 121 to drive a stop actuator 113, thereby controlling a light amount control operation of the stop unit 114. The lens microcomputer 111 further drives an image-stabilizing actuator 126 through an image-stabilizing driver 125 depending on a shake detected by a shake sensor (not illustrated) constituted by a vibration gyro or the like and provided in the interchangeable lens 100, thereby performing an image-stabilizing process to control the movement of the image-stabilizing lens 103.

The camera body 200 includes an image sensor 201 constituted by a CCD sensor, a CMOS sensor or the like, an A/D converter 202, a signal processor 203, a recorder 204, the camera microcomputer 205 and a display unit 206.

The image sensor 201 photoelectrically converts an object image formed by the image-capturing optical system in the interchangeable lens 100 to output an image-capturing signal as an analog electrical signal. The A/D converter 202 converts the analog image-capturing signal from the image sensor 201 into a digital image-capturing signal. The signal processor 203 performs various image processes on the digital image-capturing signal from the A/D converter 202 to produce a video signal.

The signal processor 203 produces, from the video signal, focus information indicating a contrast state of the object image (that is, a focus state of the image-capturing optical system) and luminance information indicating an exposure state. The signal processor 203 outputs the video signal to the display unit 206. The display unit 206 displays the video signal as a live-view image used for checking an image-capturing composition and the focus state.

The camera microcomputer 205 as a camera controller controls the camera body 200 in response to inputs from a camera operation unit 207 including an image-capturing instructing switch and various setting switches (not illustrated). The camera microcomputer 205 transmits, in response to a user's operation of a zoom switch (not illustrated), the control command relating to the magnification-varying operation of the magnification-varying lens 102 to the lens microcomputer 111 through a camera data transceiver 208b. Moreover, the camera microcomputer 205 transmits to the lens microcomputer 111, through the camera data transceiver 208b, the control command relating to the light amount control operation of the stop unit 114 depending on the luminance information and the control command relating to the focusing operation of the focus lens 104 depending on the focus information.

Next, with referring to FIG. 2, description will be made of a communication circuit constituted between the camera body 200 (camera microcomputer 205) and the interchangeable lens 100 (lens microcomputer 111) and of data communication performed therebetween. The camera microcomputer 205 has a function of managing settings for the data communication with the lens microcomputer 111 and a function of providing notices such as the transmission requests. On the other hand, the lens microcomputer 111 has a function of producing lens data and a function of transmitting the lens data.

The camera microcomputer 205 includes a camera communication interface circuit 208a, and the lens microcomputer 111 includes a lens communication interface circuit 112a. The camera microcomputer 205 (camera data transceiver 208b) and the lens microcomputer 111 (lens data transceiver 112b) communicate with each other through the communication terminals (illustrated by three boxes) provided in the mount 300 and the camera and lens communication interface circuits 208a and 112a.

In this embodiment, the camera and lens microcomputers 205 and 111 perform three-wire asynchronous serial communication using three channels. The camera communication interface circuit 208a and the camera data transceiver 208b constitute the camera communicator 208. The lens data transceiver 112b and the lens communication interface circuit 112a constitute the lens communicator 112.

The three channels are a transmission request channel as a notification channel, a first data communication channel and a second data communication channel. The transmission request channel is used for providing the notices such as the transmission requests (transmission instructions) for the lens data and switch requests (switch instructions) for communication settings described later, from the camera microcomputer 205 to the lens microcomputer 111. The provision of the notice through the transmission request channel is performed by switching a signal level (voltage level) on the transmission request channel between High as a first level and Low as a second level. A transmission request signal provided to the transmission request channel is hereinafter referred to as "a request-to-send signal RTS".

The first data communication channel is used for transmitting the lens data from the lens microcomputer 111 to the camera microcomputer 205. The lens data transmitted as a signal from the lens microcomputer 111 to the camera microcomputer 205 through the first data communication channel is hereinafter referred to as "a lens data signal DLC". The second data communication channel is used for transmitting camera data from the camera microcomputer 205 to the lens microcomputer 111. The camera data transmitted as a signal from the camera microcomputer 205 to the lens microcomputer 111 through the second data communication channel is hereinafter referred to as "a camera data signal DCL".

Furthermore, in this embodiment, the communication interface circuits 208a and 112a switch a communication direction (communication setting) in the second data communication channel, which allows the second data communication channel to be used for transmitting the lens data from the lens microcomputer 111 to the camera microcomputer 205. Specifically, the communication circuit provides, for the second data communication channel, input and output buffers connected in parallel thereto such that an input/output direction in the second data communication channel is switchable. The input and output buffers are exclusively selectable. The input and output buffers connected in parallel to the second data communication channel are hereinafter collectively referred to as "an input/output buffer". In the following description, lens data transmitted from the lens microcomputer 111 to the camera microcomputer 205 through the second data communication channel is referred to as "a second lens data signal DLC2".

In addition, the lens data signal DLC transmitted from the lens microcomputer 111 to the camera microcomputer 205 with the transmission of the second lens data signal DLC2 through the first data communication channel is referred to as "a first lens data signal DLC" in order to distinguish this first lens data signal DLC from the second lens data signal DLC2. Furthermore, a communication setting as a first communication setting in which the lens data signal DLC is transmitted from the lens microcomputer 111 to the camera microcomputer 205 only through the first data communication channel (and the camera data signal DCL is transmitted through the first data communication channel) is referred to as "a normal communication setting".

On the other hand, a communication setting as a second communication setting in which the first and second lens data signals DLC and DLC2 are transmitted from the lens microcomputer 111 to the camera microcomputer 205 through the first and second data communication channels is referred to as "a DLC2ch communication setting".

Next, the three-wire asynchronous serial communication in this embodiment will be described in detail. The request-to-send signal RTS is provided from the camera microcomputer 205 as a communication master to the lens microcomputer 111 as a communication slave. The camera data signal DCL includes various control commands and transmission request commands transmitted from the camera microcomputer 205 to the lens microcomputer 111. The lens data signal DLC includes various lens data transmitted from the lens microcomputer 111 to the camera microcomputer 205. The camera and lens microcomputers 205 and 111 set their communication speed beforehand and perform the communication (transmission and receipt) at a communication bit rate according to this setting. The communication bit rate indicates a data amount transferable per second and is expressed with a unit of bps (bits per second).

Figure 3:
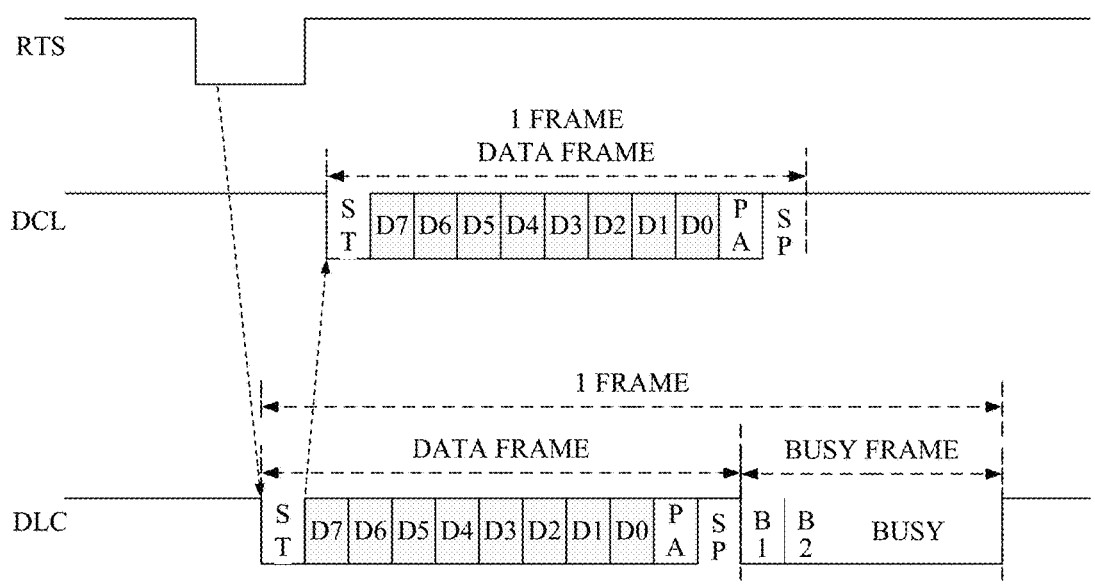
FIG. 3 illustrates communication waveforms in a normal communication setting in Embodiment 1.

With referring to FIG. 3, description will be made of communication procedures between the camera and lens microcomputers 205 and 111. FIG. 3 illustrates waveforms of communication signals in one frame as a minimum communication unit. The camera data signal DCL and the lens data signal DLC have mutually different parts in their data formats in the one frame.

First, description will be made of the data format of the lens data signal DLC. The lens data signal DLC in the one frame includes, as large parts, a data frame as a first frame and a BUSY frame as a subsequent frame. The signal level of the lens data signal DLC is held at High in a non-transmission state where data transmission is not performed. The lens microcomputer 111 sets the signal level to Low in one bit time period in order to provide a notice of a start of one frame transmission of the lens data signal DLC to the camera microcomputer 205. This one bit time period is called "a start bit ST" at which one data frame is started.

Next, the lens microcomputer 111 transmits one-byte lens data in eight bit time period from a subsequent second bit to a ninth bit. The data bits are arranged in an MSB-first format starting from a highest-order data bit D7 and continuing to data bits D6, D5, D4, D3, D2 and D1 in this order and ending with a lowest-order data bit D0. Then, the lens microcomputer 111 adds one bit parity information PA at tenth bit and sets the signal level of the lens data signal DLC to High in a time period of a stop bit SP indicating an end of the one frame. Thus, the data frame starting from the start bit ST ends.

Thereafter, the lens microcomputer 111 adds the BUSY frame after the stop bit SP. The BUSY frame indicates a time period of a communication standby request BUSY as a notice (hereinafter referred to as "a BUSY notice") from the lens microcomputer 111 to the camera microcomputer 205. The lens microcomputer 111 holds the signal level of the lens data signal DLC to Low until terminating the BUSY notice.

Next, description will be made of a data format of the camera data signal DCL. Specifications of the data format of the camera data signal DCL in one frame are common to those of the lens data signal DLC. However, the addition of the BUSY frame to the camera data signal DCL is prohibited, which is different from the lens data signal DLC. Next, the communication procedures between the camera and lens microcomputers 205 and 111 will be described. The camera microcomputer 205 sets a signal level of the request-to-send signal RTS to Low (in other words, asserts the request-to-send signal RTS) to provide the transmission request to the lens microcomputer 111. The lens microcomputer 111 having detected the transmission request through the assertion (Low) of the request-to-send signal RTS performs a process to produce the lens data signal DLC to be transmitted to the camera microcomputer 205. Then, after a preparation of the transmission of the lens data signal DLC is completed, the lens microcomputer 111 starts transmitting one frame of the lens data signal DLC through the first data communication channel. The lens microcomputer 111 starts the transmission of the lens data signal DLC within a time period mutually set by the camera and lens microcomputers 205 and 111 after the assertion of the request-to-send signal RTS.

Next, in response to detecting the start bit ST as a head bit of the data frame of the lens data signal DLC received from the lens microcomputer 111, the camera microcomputer 205 returns the signal level of the request-to-send signal RTS to High, in other words, negates the request-to-send signal RTS. The camera microcomputer 205 thereby terminates the transmission request and starts the transmission of the camera data signal DCL through the second data communication channel. The negation of the request-to-send signal RTS may be performed any one of before and after the start of the transmission of the camera data signal DCL. It is only necessary that these negation and transmission be performed until the receipt of the data frame of the lens data signal DLC is completed.

The lens microcomputer 111 having transmitted the data frame of the lens data signal DLC adds the BUSY frame to the lens data signal DLC in a case where the BUSY notice is necessary to be provided to the camera microcomputer 205. The camera microcomputer 205 monitors the presence or absence of the BUSY notice and prohibits the assertion of the request-to-send signal RTS for a next transmission request while the BUSY notice is provided. The lens microcomputer 111 executes necessary processes in a time period where the transmission request from the camera microcomputer 205 is prohibited by the BUSY notice and terminates the BUSY notice after a next communication preparation is completed. The assertion of the request-to-send signal RTS by the camera microcomputer 205 for the next transmission request is permitted under a condition that the BUSY notice is terminated and the transmission of the data frame of the camera data signal DCL is completed.

As just described, in this embodiment, in response to the assertion of the request-to-send signal RTS upon a communication starting event generated in the camera microcomputer 205, the lens microcomputer 111 starts transmitting the data frame of the lens data signal DLC to the camera microcomputer 205. On the other hand, the camera microcomputer 205 having detected the start bit ST of the lens data signal DLC starts transmitting the data frame of the camera data signal DCL to the lens microcomputer 111. The lens microcomputer 111 adds, as needed, the BUSY frame to the data frame of the lens data signal DLC for providing the BUSY notice and then terminates the BUSY notice to end one frame communication process.

In this communication process, the camera microcomputer 205 and the lens microcomputer 111 mutually transmit and receive one byte data.

Figure 4:
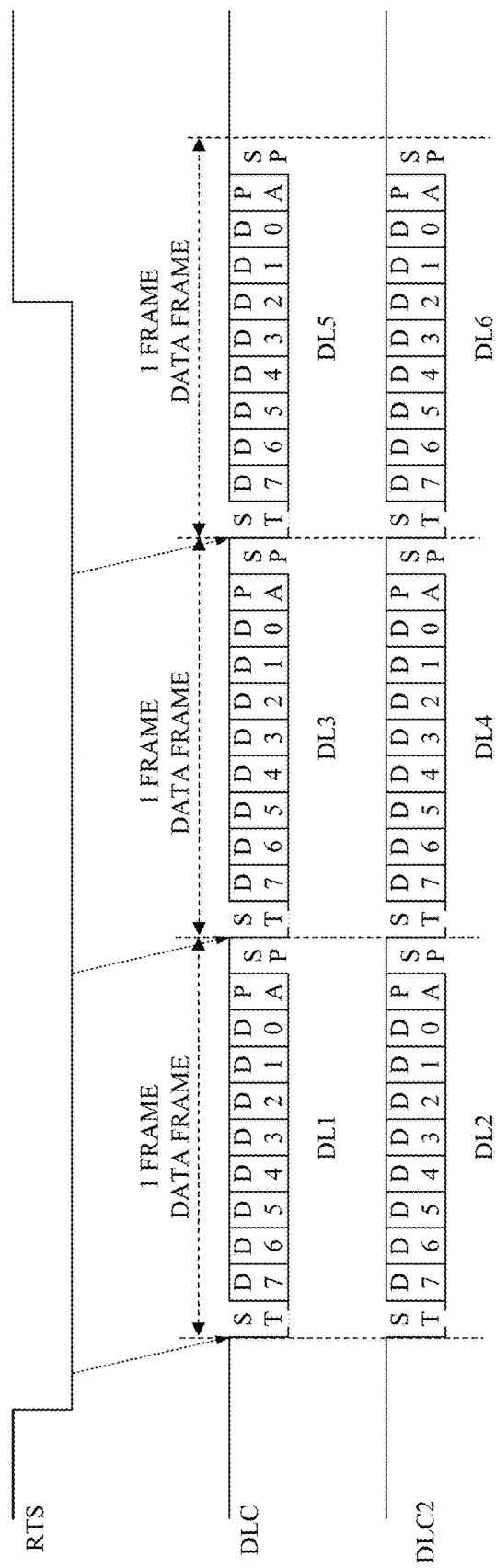
FIG. 4 illustrates communication waveforms in a DLC2ch communication setting in Embodiment 1.

Next, description will be made of the DLC2ch communication setting with referring to FIG. 4. In the DLC2ch communication setting for lens data transmission from the lens microcomputer 111 to the camera microcomputer 205, the first lens data signal DLC is transmitted through the first data communication channel, and in addition thereto, the second lens data signal DLC2 is transmitted through the second data communication channel. The lens data transmission through the two data communication channels enables a large volume lens data transmission in a short time (at a high speed). FIG. 4 illustrates communication signal waveforms of the first and second lens data signals DLC and DLC2 in continuous three frames. With referring to FIG. 4, description will be made of a data format of the first and second lens data signals DLC and DLC2. Each frame of each of the first and second lens data signals DLC and DLC2 is constituted by a data frame and does not include the BUSY frame. That is, the first and second lens data signals DLC and DLC2 have a data format not allowing transmitting the BUSY notice from the lens microcomputer 111 to the camera microcomputer 205. Furthermore, the DLC2ch communication setting is customized as a communication setting used only for the lens data transmission from the lens microcomputer 111 to the camera microcomputer 205, that is, camera data transmission from the camera microcomputer 205 to the lens microcomputer 111 is unable to be performed in the DLC2ch communication setting.

Moreover, the first and second lens data signals DLC and DLC2 have a data format enabling continuous communication without a wait time between the stop bit SP of a previous frame and the start bit ST of a subsequent frame. he data frames of the first and second lens data signals DLC and DLC2 have mutually the same data formats in which one frame bit lengths thereof are equal to each other. This is for a purpose of a communication management that makes numbers of the transmitted frames equal to each other in a case where the data communication is stopped in its middle. However, relative relations of bit positions in the data frames of the first and second lens data signals DLC and DLC2 are not necessarily needed to be identical to each other, that is, a shift amount of the bit positions between the first and second lens data signals DLC and DLC2 within one frame length is allowed.

As described above, this embodiment is applied to the three-wire asynchronous serial communication using the transmission request channel (RTS) for providing the notices such as the request-to-send signal RTS from the camera microcomputer 205 to the lens microcomputer 111 and the first and second data communication channels (DLC and DCL). Furthermore, this embodiment switches the communication direction in the second data communication channel, which is used for camera data transmission from the camera microcomputer 205 to the lens microcomputer 111 in the normal communication setting, to use the second data communication channel for the lens data transmission from the lens microcomputer 111 to the camera microcomputer 205 in the DLC2ch communication setting. This switching enables a high-speed large volume lens data transmission from the first and second data communication channels (DLC and DLC2) from the lens microcomputer 111 to the camera microcomputer 205. In this lens data transmission, the lens microcomputer 111 is allowed to provide a suspension request to the camera microcomputer 205 through the first or second data communication channel, and the camera microcomputer 205 is allowed to provide a suspension request to the lens microcomputer 111 through the transmission request channel (RTS). Accordingly, the lens and camera microcomputers 111 and 205 enable properly providing the suspension requests to the other microcomputer depending on their processing speeds, thereby enabling a high-speed large volume data communication sufficiently utilizing processing performances of the lens and camera microcomputers 111 and 205.

Figure 5:
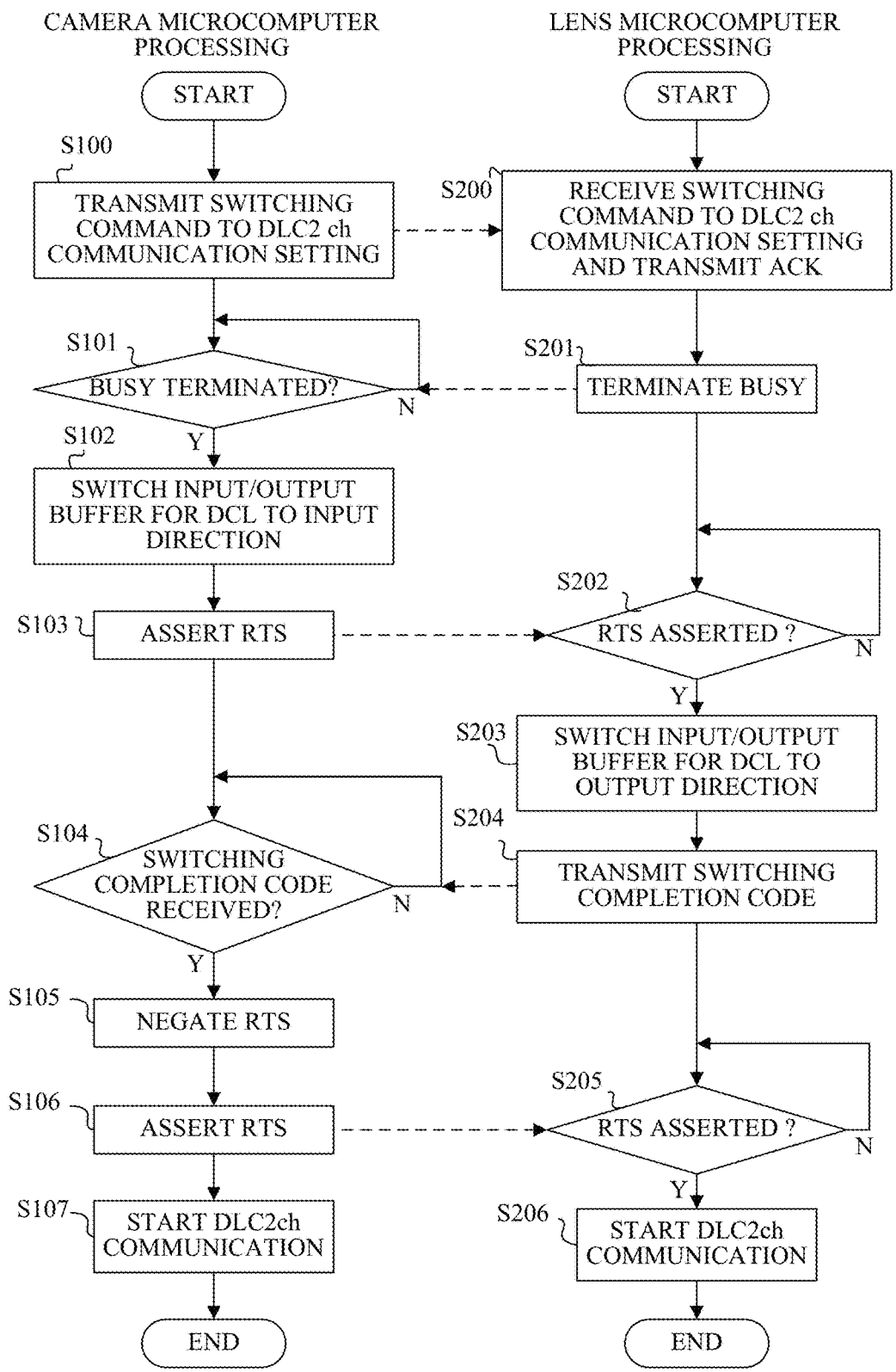
FIG. 5 is a flowchart illustrating a communication setting switching process for switching from the normal communication setting to a DLC2ch communication setting in Embodiment 1.
Figure 6:
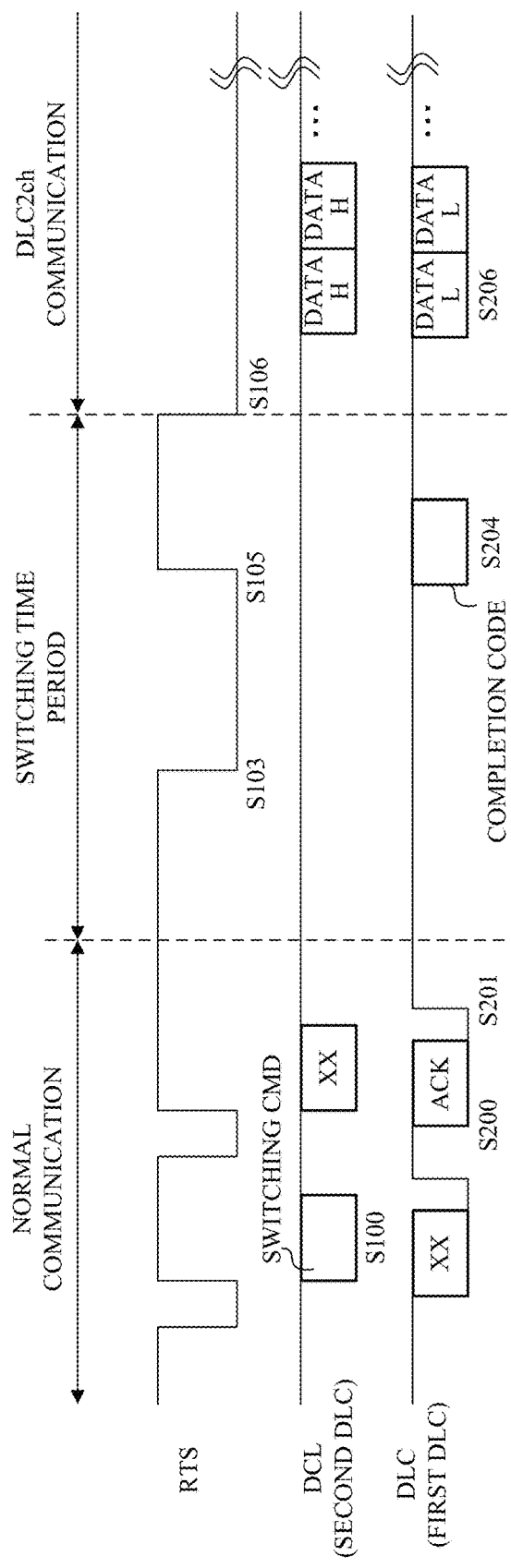
FIG. 6 is a time chart illustrating the communication setting switching process for switching from the normal communication setting to the DLC2ch communication setting in Embodiment 1.

However, when the normal communication setting is switched to the DLC2ch communication setting, it is necessary to avoid collision of the camera data signal DCL transmitted from the camera microcomputer 205 with the lens data signal DLC2 transmitted from the lens microcomputer 111. Thus, in this embodiment, the camera and lens microcomputers 205 and 111 execute a communication setting switching process illustrated by a flowchart in FIG. 5 and by a time chart in FIG. 6 according to a communication control program as a computer program. In FIG. 6 and the following description, "S" represents a step in FIG. 5. First, at S100, the camera microcomputer 205 in the normal communication setting transmits a switching command instructing the lens microcomputer 111 to switch from the normal communication setting to the DLC2ch communication setting through the second data communication channel (DCL). The lens microcomputer 111 having received at S200 the switching command transmits, in a next frame, an acknowledgment (ACK) indicating the receipt of the switching command to the camera microcomputer 205 through the first data communication channel (DLC).

Then, in response to a termination of the BUSY notice by the lens microcomputer 111 at S201, the camera microcomputer 205 at S101 recognizes the termination of the BUSY notice, that is, recognizes that the lens microcomputer 111 is in a communicable state to start at S102 the communication setting switching process. The camera microcomputer 205 first switches the input/output direction of the input/output buffer for the second data communication channel in the camera communication interface circuit 208a illustrated in FIG. 2 to an input direction. After this switching is completed, the camera microcomputer 205 at S103 asserts the request-to-send signal RTS. In response thereto, the camera microcomputer 205 provides, to the lens microcomputer 111, a notice (first notice) indicating the completion of the camera-microcomputer side switching (image-capturing apparatus side switching) from the normal communication setting to the DLC2ch communication setting. The lens microcomputer 111 having detected at S202 the assertion of the request-to-send signal RTS switches at S203 the input/output direction of the input/output buffer for the second data communication channel in the lens communication interface circuit 112a illustrated in FIG. 2 to an output direction.

After this switching is completed, the lens microcomputer 111 at S204 transmits a switching completion code (second notice) to the camera microcomputer 205 through the first data communication channel (DLC). The lens microcomputer 111 thereby notifies the camera microcomputer 205 that the lens-microcomputer side switching (accessory apparatus side switching) from the normal communication setting to the DLC2ch communication setting is completed. The switching completion code may be transmitted through the second data communication channel (DLC2).

The camera microcomputer 205 having received at S104 the switching completion code from the lens microcomputer 111 temporarily negates the request-to-send signal RTS at S105, and then at S106 asserts the request-to-send signal RTS again (that is, provides a third notice). The lens microcomputer 111 having detected at S205 the assertion of the request-to-send signal RTS starts at S206 transmitting the first and second lens data signals DLC and DLC2 in the DLC2ch communication setting. In response thereto, the camera microcomputer 205 at S107 starts receiving the first and second lens data signals DLC and DLC2 in the DLC2ch communication setting.

The above-described communication setting switching process enables avoiding the collision between the first and second lens data signals DLC and DLC2 (that is, data collision) in the second data communication channel.

As described above, this embodiment starts the data communication in the DLC2ch communication setting after the camera and lens microcomputers 205 and 111 mutually confirm the completion of the switching from the normal communication setting to the DLC2ch communication setting through the transmission request channel and the first data communication channel.

When starting the data communication in the DLC2ch communication setting, the camera microcomputer 205 first switches from the normal communication setting to the DLC2ch communication setting, and then the lens microcomputer 111 having confirmed this switching switches from the normal communication setting to the DLC2ch communication setting. That is, after the switching to the DLC2ch communication setting, the camera microcomputer 205 as a data receiver first switches from the normal communication setting to the DLC2ch communication setting. This switching procedure enables more surely avoiding the above-described data collision as compared with a case where the lens microcomputer 111, which becomes a data transmitter after the switching to the DLC2ch communication setting, switches from the normal communication setting to the DLC2ch communication setting prior to or simultaneously with the switching by the camera microcomputer 205.

Embodiment 2

Figure 2:
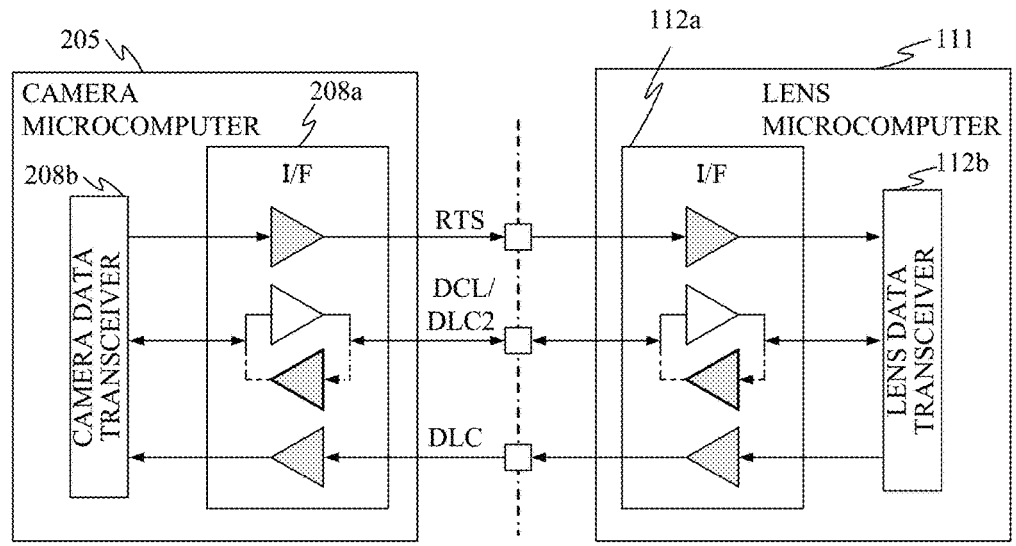
FIG. 2 illustrates a communication circuit between a camera body and an interchangeable lens in Embodiment 1.
Figure 7:
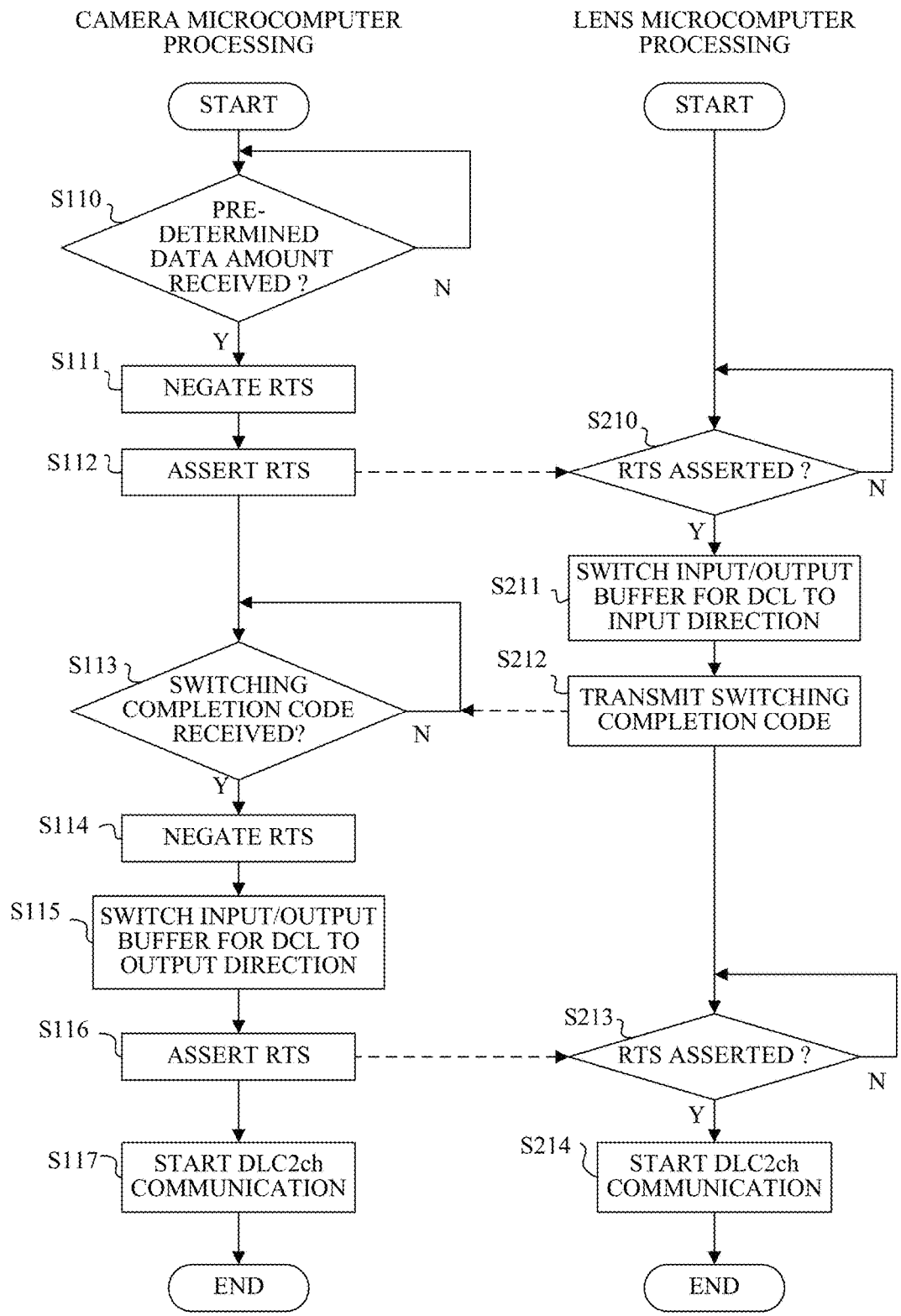
FIG. 7 is a flowchart illustrating a communication setting switching process for switching from the normal communication setting to the DLC2ch communication setting in Embodiment 2 of the present invention.
Figure 8:
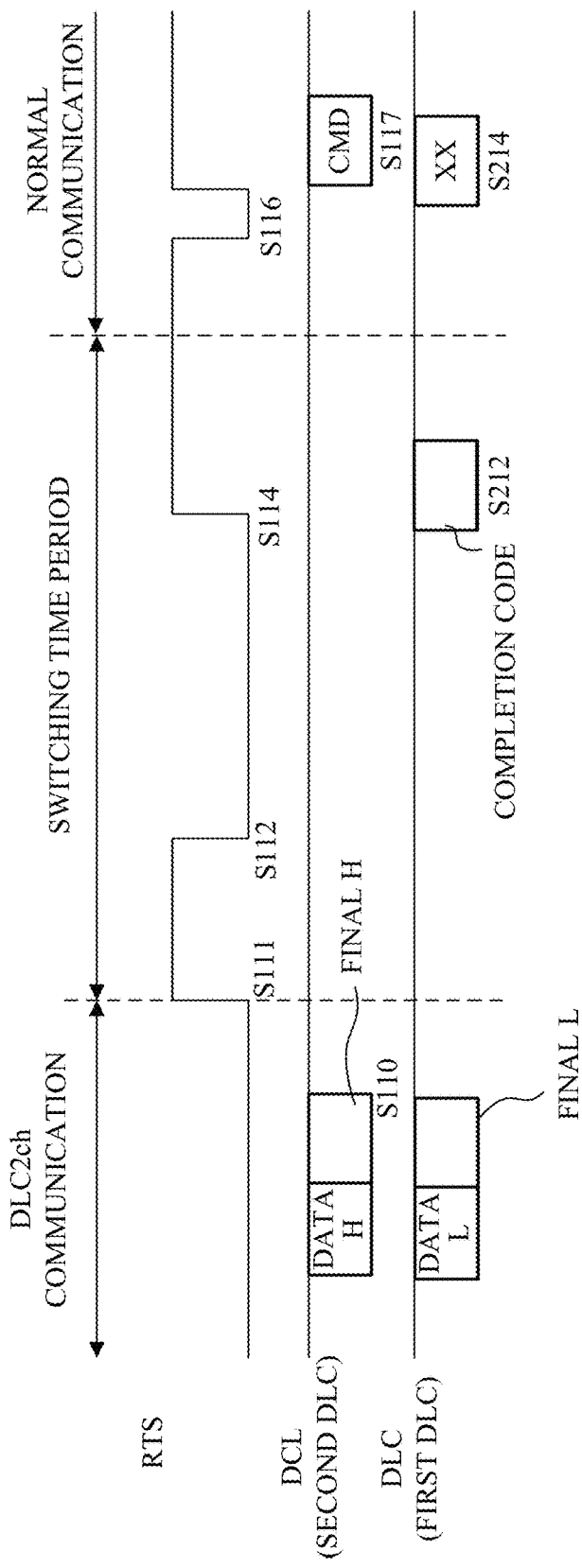
FIG. 8 is a time chart illustrating the communication setting switching process for switching from the DLC2ch communication setting to the normal communication setting to in Embodiment 2.

A flowchart of FIG. 7 and a time chart of FIG. 8 illustrate a communication setting switching process of switching the communication setting of the camera microcomputer 205 and the lens microcomputer 111 from the DLC2ch communication setting to the normal communication setting in the configuration of the camera system of FIGS. 1 and 2. Also when the communication setting is switched from the DLC2ch communication setting to the normal communication setting, it is necessary to avoid a collision between the second lens data signal DLC2 and the camera data signal DCL. Thus, in a second embodiment (Embodiment 2) of the present invention, the camera and lens microcomputers 205 and 111 execute the communication setting switching process of switching from the DLC2ch communication setting to the normal communication setting according to a communication control program as a computer program. In FIG. 8 and the following description, "S" represents a step in FIG. 7.

First, at S110 the camera microcomputer 205 determines in the DLC2ch communication setting whether or not receipt of the second lens data communication signal DLC2 corresponding to a predetermined data amount from the lens microcomputer 111 has been completed. If the receipt of the second lens data communication signal DLC2 has been completed, the camera microcomputer 205 at S111 negates the request-to-send signal RTS, and then at S112 asserts the request-to-send signal RTS. The camera microcomputer 205 provides, using these negation and assertion, a notice (fourth notice) requesting the lens microcomputer 111 to switch from the DLC2ch communication setting to the normal communication setting.

The lens microcomputer 111 having detected at S210 the assertion of the request-to-send signal RTS switches at S211 the input/output direction of the input/output buffer for the second data communication channel in the lens communication interface circuit 112a to an output direction. After this switching is completed, the lens microcomputer 111 at S212 transmits the switching completion code (fifth notice) to the camera microcomputer 205 through the first data communication channel (DLC). The lens microcomputer 111 thereby notifies the camera microcomputer 205 that the lens-microcomputer side switching (accessory apparatus side switching) from the DLC2ch communication setting to the normal communication setting has been completed.

The camera microcomputer 205 having received at S113 the switching completion code from the lens microcomputer 111 negates the request-to-send signal RTS at S114.

Next, the camera microcomputer 205 at S115 switches the input/output direction of the input/output buffer for the second data communication channel in the camera communication interface circuit 208a to an output direction. After this switching is completed and a preparation of data communication in the normal communication setting is completed, the camera microcomputer 205 at S116 asserts the request-to-send signal RTS (that is, provides a sixth notice) and then at S117 starts the data communication in the normal communication setting.

The lens microcomputer 111 having detected at S213 the assertion of the request-to-send signal RTS starts at S214 transmitting the lens data signal DLC in the normal communication setting.

The above-described communication setting switching process enables avoiding the collision between the second lens data signal DLC2 and the camera data signal DCL (that is, data collision) in the second data communication channel.

As described above, this embodiment starts the data communication in the normal communication setting after the camera and lens microcomputers 205 and 111 mutually confirm the completion of the switching from the DLC2cn communication setting to the normal communication setting through the transmission request channel and the first data communication channel. When the data communication in the normal communication setting is started, the lens microcomputer 111 first switches from the normal communication setting to the DLC2ch communication setting, and then the camera microcomputer 205 having confirmed the above switching switches from the normal communication setting to the DLC2ch communication setting. That is, after the switching to the normal communication setting, the lens microcomputer 111 as a data receiver first switches from the DLC2ch communication setting to the normal communication setting. This switching procedure enables more surely avoiding the above-described data collision as compared with a case where the camera microcomputer 205, which becomes a data transmitter after the switching to the normal communication setting, switches from the DLC2ch communication setting to the normal communication setting prior to or simultaneously with the switching by the lens microcomputer 111.

Each of the above-described embodiments using the three channels that are the notification channel and the first and second data communication channels enables, only by setting the second data communication channel to the second setting, a high-speed large volume data communication from the accessory apparatus to the image-capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-069852, filed on Mar. 31, 2016, which is hereby incorporated by reference herein in its entirety.

What is claimed is:

1. An accessory apparatus detachably attachable to an image-capturing apparatus, the accessory apparatus comprising:
   an accessory communicator configured to provide, with the image-capturing apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus; and
   an accessory controller configured to control data communication with the image-capturing apparatus through the accessory communicator,
   wherein:
   the image-capturing apparatus and the accessory apparatus are each configured to have a function of switching the second data communication channel between a first setting in which the data transmission from the image-capturing apparatus to the accessory apparatus is allowed and a second setting in which data transmission from the accessory apparatus to the image-capturing apparatus is allowed;
   the accessory controller is configured to,
   in response to receiving from the image-capturing apparatus through the notification channel a first notice indicating completion of switching from the first setting to the second setting in the image-capturing apparatus,
   switch from the first setting to the second setting in the accessory apparatus.

2. An accessory apparatus according to claim 1, wherein the accessory controller is configured to,
   in response to completion of switching from the first setting to the second setting in the accessory apparatus,
   transmit a second notice indicating the completion of switching from the first setting to the second setting in the accessory apparatus to the image-capturing apparatus through the first or second data communication channel.

3. An accessory apparatus according to claim 2, wherein the accessory controller is configured to,
   after transmitting the second notice to the image-capturing apparatus, in response to receiving from the image-capturing apparatus through the notification channel a third notice for instructing data transmission,
   perform the data transmission to the image-capturing apparatus through the first and second data communication channels.

4. An accessory apparatus according to claim 1, wherein the accessory controller is configured to, from a state where the second setting is made in the image-capturing and accessory apparatuses, in response to receiving from the image-capturing apparatus through the notification channel a fourth notice for instructing switching from the second setting to the first setting, switch from the second setting to the first setting in the accessory apparatus.

5. An accessory apparatus according to claim 4, wherein the accessary controller is configured to, in response to completion of switching from the second setting to the first setting in the accessory apparatus, transmit a fifth notice indicating the completion of switching from the second setting to the first setting in the accessory apparatus to the image-capturing apparatus through the first data communication channel.

6. An accessory apparatus according to claim 5, wherein the accessary controller is configured to, after transmitting the fifth notice, in response to receiving from the image-capturing apparatus a sixth notice for instructing data transmission, perform the data transmission to the image-capturing apparatus through the first data communication channel.

7. An accessory apparatus according to claim 1, wherein the accessary controller is configured to receive the notice through the notification channel by switching of a signal level on the notification channel from a first level to a second level.

8. An accessory apparatus according to claim 1, wherein the accessory controller is configured to perform asynchronous serial communication with the image-capturing apparatus.

9. An image-capturing apparatus to which an accessory apparatus is detachably attachable, the image-capturing apparatus comprising:

a camera communicator configured to provide, with the accessory apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus; and a camera controller configured to control data communication with the accessory apparatus through the camera communicator, wherein:

the image-capturing apparatus and the accessory apparatus are each configured to have a function of switching the second data communication channel between a first setting in which the data transmission from the image-capturing apparatus to the accessory apparatus is allowed and a second setting in which data transmission from the accessory apparatus to the image-capturing apparatus is allowed;

the camera controller is configured to switch from the first setting to the second setting before the accessory apparatus does, and provide, in response to completion of switching from the first setting to the second setting in the image-capturing apparatus, a first notice indicating the completion of switching from the first setting to the second setting in the image-capturing apparatus to the accessory apparatus through the notification channel.

10. An image-capturing apparatus according to claim 9, wherein the camera controller is configured to, in response to receiving from the accessory apparatus through the first or second data communication channel a second notice indicating completion of switching from the first setting to the second setting in the accessory apparatus, provide to the accessory apparatus through the notification channel a third notice for instructing data transmission to the image-capturing apparatus through the first and second communication channels.

11. An image-capturing apparatus according to claim 9, wherein the camera controller is configured to, in a state where the second setting is made in the image-capturing and accessory apparatuses, provide to the accessory apparatus a fourth notice for instructing switching from the second setting to the first setting through the notification channel.

12. An image-capturing apparatus according to claim 11, wherein the camera controller is configured to, in response to receiving from the accessory apparatus a fifth notice indicating completion of switching from the second setting to the first setting in the accessory apparatus, switch from the second setting to the first setting in the image-capturing apparatus.

13. An image-capturing apparatus according to claim 11, wherein the camera controller is configured to, after completion of switching from the second setting to the first setting in the image-capturing apparatus, provide a sixth notice for instructing the accessory apparatus to perform data transmission to the image-capturing apparatus through the first data communication channel.

14. An image-capturing apparatus according to claim 9, wherein the camera controller is configured to provide the notice through the notification channel by switching of a signal level on the notification channel from a first level to a second level.

15. An image-capturing apparatus according to claim 9, wherein the camera controller is configured to perform asynchronous serial communication with the accessory apparatus.

16. A control method for an accessory apparatus detachably attachable to an image-capturing apparatus, the method comprising the steps of:

causing the accessory apparatus to provide, with the image-capturing apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus;

providing to each of the image-capturing apparatus and the accessory apparatus a function of switching the second data communication channel between a first setting in which the data transmission from the image-capturing apparatus to the accessory apparatus is allowed and a second setting in which data transmission from the accessory apparatus to the image-capturing apparatus is allowed; and causing the accessory apparatus to, in response to receiving from the image-capturing apparatus through the notification channel a first notice indicating completion of switching from the first setting to the second setting in the image-capturing apparatus, switch from the first setting to the second setting in the accessory apparatus.

17. A control method for an image-capturing apparatus to which an accessory apparatus is detachably attachable, the method comprising the steps of:
  causing the image-capturing apparatus to provide, with the accessory apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus;
  providing to each of the image-capturing apparatus and the accessory apparatus a function of switching the second data communication channel between a first setting in which the data transmission from the image-capturing apparatus to the accessory apparatus is allowed and a second setting in which data transmission from the accessory apparatus to the image-capturing apparatus is allowed; and
  causing the image-capturing apparatus to switch from the first setting to the second setting before the accessory apparatus does, and to provide, in response to completion of switching from the first setting to the second setting in the image-capturing apparatus, a first notice indicating the completion of switching from the first setting to the second setting in the image-capturing apparatus to the accessory apparatus through the notification channel.

18. A non-transitory storage medium storing a control program as a computer program for causing a computer to execute a control method for an accessory apparatus detachably attachable to an image-capturing apparatus, the method comprising the steps of:
  causing the accessory apparatus to provide, with the image-capturing apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus;
  providing to each of the image-capturing apparatus and the accessory apparatus a function of switching the second data communication channel between a first setting in which the data transmission from the image-capturing apparatus to the accessory apparatus is allowed and a second setting in which data transmission from the accessory apparatus to the image-capturing apparatus is allowed; and
  causing the accessory apparatus to,
    in response to receiving from the image-capturing apparatus through the notification channel a first notice indicating completion of switching from the first setting to the second setting in the image-capturing apparatus,
    switch from the first setting to the second setting in the accessory apparatus.

19. A non-transitory storage medium storing a control program as a computer program for causing a computer to execute a control method for an image-capturing apparatus to which an accessory apparatus is detachably attachable, the method comprising the steps of:
  causing the image-capturing apparatus to provide, with the accessory apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus;
  providing to each of the image-capturing apparatus and the accessory apparatus a function of switching the second data communication channel between a first setting in which the data transmission from the image-capturing apparatus to the accessory apparatus is allowed and a second setting in which data transmission from the accessory apparatus to the image-capturing apparatus is allowed; and
  causing the image-capturing apparatus to switch from the first setting to the second setting before the accessory apparatus does, and to provide, in response to completion of switching from the first setting to the second setting in the image-capturing apparatus, a first notice indicating the completion of switching from the first setting to the second setting in the image-capturing apparatus to the accessory apparatus through the notification channel.

* * * * *